(12) United States Patent
Auber

(10) Patent No.: US 6,601,854 B2
(45) Date of Patent: Aug. 5, 2003

(54) SHAFT SEAL

(75) Inventor: Philippe Jacques Auber, La Havre (FR)

(73) Assignee: Dresser-Rand S.A., Rungis Cedex (FR)

( * ) Notice: Subject to any disclaimer, the term of this patent is extended or adjusted under 35 U.S.C. 154(b) by 0 days.

(21) Appl. No.: 09/938,175

(22) Filed: Aug. 23, 2001

(65) Prior Publication Data

US 2002/0047239 A1 Apr. 25, 2002

Related U.S. Application Data

(63) Continuation of application No. PCT/EP00/01579, filed on Feb. 25, 2000.

(30) Foreign Application Priority Data

Feb. 25, 1999 (EP) .............................. 99400460

(51) Int. Cl.$^7$ ................................. F16J 15/34
(52) U.S. Cl. ................... 277/377; 277/358; 277/512
(58) Field of Search ................ 277/358, 512, 277/377

(56) References Cited

U.S. PATENT DOCUMENTS

| | | | | |
|---|---|---|---|---|
| 3,475,033 A | * | 10/1969 | Voitik | 277/358 |
| 3,701,535 A | * | 10/1972 | Born et al. | 277/358 |
| 4,095,806 A | | 6/1978 | Dempsey | 277/27 |
| 4,123,069 A | * | 10/1978 | Sato | 277/358 |
| 4,191,386 A | * | 3/1980 | Hershey | 277/358 |
| 4,212,475 A | * | 7/1980 | Sedy | 277/358 |
| 4,872,517 A | * | 10/1989 | Shaw et al. | 277/358 |
| 4,943,069 A | * | 7/1990 | Jinnouchi | 277/358 |
| 5,224,714 A | * | 7/1993 | Kimura et al. | 277/358 |
| 5,244,215 A | * | 9/1993 | Cather et al. | 277/512 |
| 5,421,593 A | | 6/1995 | Aritsubo et al. | |
| 5,443,274 A | * | 8/1995 | Fuse | 277/358 |
| 5,558,342 A | | 9/1996 | Sedy | 277/81 |
| 5,681,047 A | * | 10/1997 | Klostermann et al. | 277/512 |
| 5,924,697 A | * | 7/1999 | Parker et al. | 277/369 |
| 5,938,206 A | * | 8/1999 | Klosterman et al. | 277/399 |
| 6,131,913 A | * | 10/2000 | Auber et al. | 277/372 |
| 6,182,971 B1 | * | 2/2001 | Parker et al. | 277/348 |
| 6,267,382 B1 | * | 7/2001 | Auber | 277/390 |
| 6,293,555 B1 | * | 9/2001 | Sedy | 277/379 |
| 6,347,800 B1 | * | 2/2002 | Auber | 277/347 |
| 6,425,583 B1 | * | 7/2002 | Muraki | 277/358 |

FOREIGN PATENT DOCUMENTS

| | | |
|---|---|---|
| DE | 3942408 A1 | 5/1991 |
| EP | 0591586 A1 | 4/1994 |
| EP | 0 591 586 A1 | 4/1994 |
| WO | WO 96/15397 | 5/1996 |
| WO | WO 96/33357 | 10/1996 |
| WO | WO 96/33358 | 10/1996 |

* cited by examiner

Primary Examiner—J. J. Swann
Assistant Examiner—Carlos Lugo
(74) Attorney, Agent, or Firm—Haynes and Boone, LLP.

(57) ABSTRACT

A shaft seal in which a rotary dealing part is mounted coaxially with a sealing element and forms therewith a primary seal between opposed faces of the sealing element and the rotary sealing part to substantially prevent fluid flow across the primary seal from a high pressure radial side to a low-pressure radial side. Secondary and tertiary seals are also provided between the high-pressure and low-pressure radial sides; and between an auxiliary sleeve and the seal housing, respectively.

25 Claims, 9 Drawing Sheets

SHAFT SEAL

Figure 1:
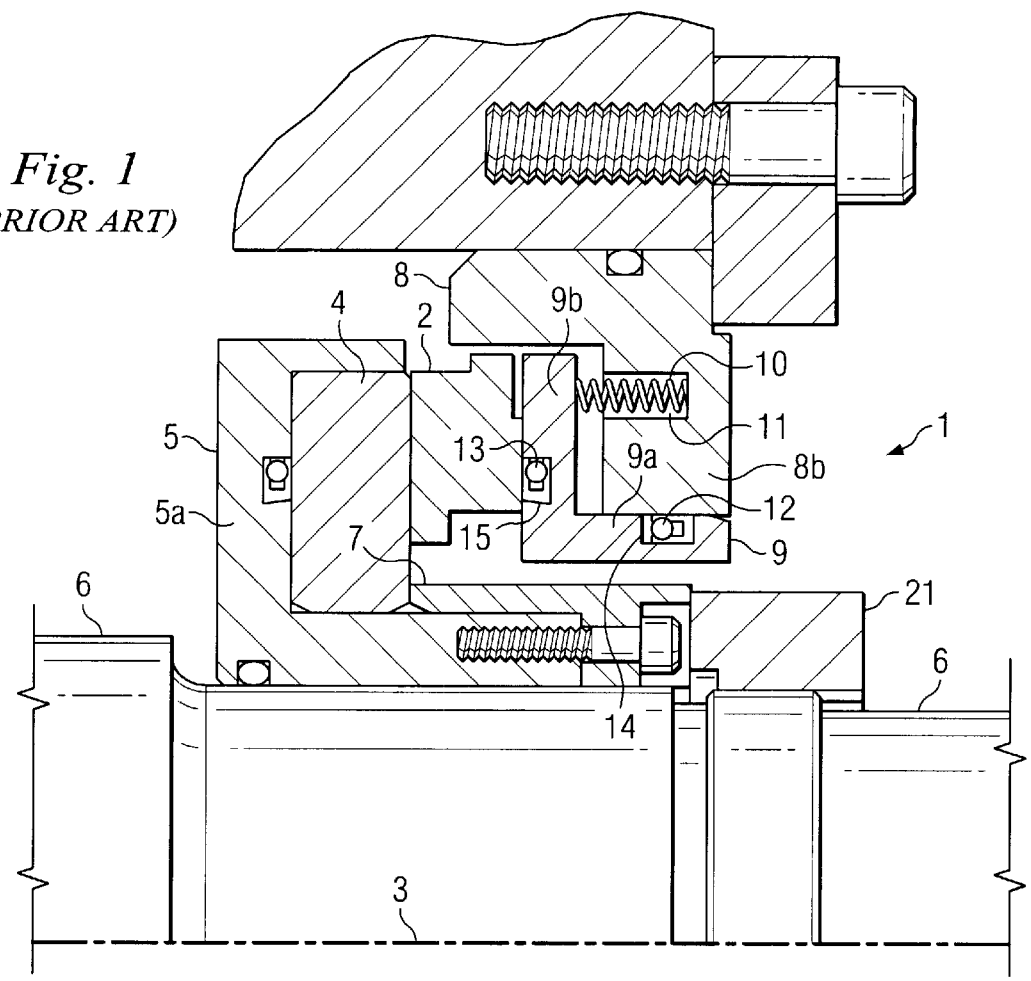

This application is a continuation of PCT/EP00/01579 filed Feb. 25, 2000.

The invention relates to a shaft seal for rotating shafts in turbo-machines or other pressurized machine. In particular, the present invention, in common with WO-A-96/33357 provides a shaft seal comprising a sealing element, a rotary sealing part mounted coaxially with the sealing element and forming therewith a contactless primary seal between opposed faces of the sealing element and rotary sealing part to substantially prevent fluid flow across the primary seal from a high pressure radial side to a low-pressure radial side, a seal housing, a pusher sleeve disposed, between the seal housing and the sealing element, coaxially with and in contact with the sealing element, biasing means urging the pusher sleeve away from the seal housing and against the sealing element to urge the sealing element axially towards the rotary sealing part, and a first sealing member disposed about the pusher sleeve and located, in a channel, in communication with the high-pressure radial side to provide a secondary seal for the pusher sleeve between the high-pressure and low-pressure radial sides. Such a shaft seal is disclosed in WO-A-96/33357.

Non-contacting shaft seals are often used with machinery for the compression or expansion of gas (hydrogen, natural gas, air, etc.) where the transmission of gas along the shaft needs to be prevented. Due to the high-pressure, high-speed machinery which is normally used, the shaft seals are chosen to be of non-contact type, in order to reduce heat build up in the seals and the wear of the sealing parts and/or in order to avoid the complexity of oil seals and their associated systems.

Non-contacting operation avoids this undesirable face contact when the shaft is rotating above a certain minimum speed, which is often called a lift-off speed.

Non-contacting shaft seals provide advantages over seals where the sealing surfaces contact one another, due to reduction in wear and the lower heat generation. Articles entitled "Fundamentals of Spiral Groove Non-contacting Face Seals" by (Gabriel, Ralph P. (Journal of American Society of Lubrication Engineers Volume 35, 7, pages 367–375), and "Improved Performance of Film-Riding Gas Seals Through Enhancement of Hydrodynamic Effects" by Sedy, Joseph (Transaction of the American Society of Lubrication Engineers, Volume 23, 1 pages 35–44) describe non-contacting seal technology and design criteria and are incorporated herein by reference.

As with ordinary mechanical seals, a non-contacting face seal consists of two principal sealing elements. At least one of the sealing elements is provided with shallow surface recesses.

These recesses are taper-shaped perpendicular to and concentric with the axis of rotation, the tapering being in the direction opposite to the direction of rotation of the shaft. In known contactless face seals, both sealing elements, in the form of rings, are positioned adjacent to each other with the sealing surfaces in contact at conditions of zero pressure differential and zero speed of rotation. One of the rings is normally fixed to the rotatable shaft by means of a shaft sleeve, the other being located within the seal housing structure and allowed to move axially. The shaft seal is designed to enable axial movement of the sealing ring and yet prevent or substantially minimize leakage of the sealed fluid. For this reason, a sealing member is placed between the ring and the housing.

As mentioned above, to achieve non-contacting operation of the seal, one of the two sealing surfaces is provided with shallow surface recesses, which act to generate pressure fields that force the two sealing surfaces apart. When the magnitude of the forces resulting from these pressure fields is large enough to overcome the forces that urge the seal faces closed, the sealing surfaces will separate and form a clearance, resulting in non-contacting operation.

As explained in detail in the above-referenced articles, the character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, during the operation of the seal or on imposition of sufficient pressure, differential equilibrium separation between both surfaces will establish itself. This occurs when closing and opening forces are in equilibrium and equal to each other. Equilibrium separation constantly changes within the range of gaps. The goal is to have the low limit of this range above zero. Another goal is to make this range as narrow as possible, because on its high end the separation between the faces will lead to increased seal leakage. Since non-contacting seals operate by definition with a clearance between sealing surfaces, their leakage will be higher than that of a contacting seal of similar geometry. Yet, the absence of contact will mean zero wear on the sealing surfaces and therefore a relatively low amount of heat generated between them. It is this low generated heat and lack of wear that enables the application of non-contacting seals to high-speed turbo machinery and other pressure machines, where the sealed fluid is gas. Turbo compressors are used to compress this fluid and since gas has a relatively low mass, they normally operate at very high speeds and with a number of compression stages in series.

As explained in the above-referenced articles, the effectiveness of the seal is largely dependent upon the so-called balance diameter of the seal. This is also true for contact seals.

When pressure is applied from the outside diameter of the seal, reduction of the balance diameter results in a greater force pushing the two sealing faces together and so a smaller gap between the faces. Thus, less gas is leaked from the system.

Known compressors have been used for compressing gas at inlet pressures of some 200 bar to delivery pressures of some 500 bar. Contactless shaft seals of the kind described above are typically used to seal against the compressor inlet pressure. The trend in compressor requirements nowadays is towards higher inlet and delivery pressures. However, such pressure levels give rise to a problem with the contactless shaft seals described above, as is now explained with reference to FIGS. 1, 1a and 2, 2a.

FIG. 1 is a partial longitudinal sectional view through the shaft seal showing the relevant structural elements of a non-contacting shaft seal of the type described above. The shaft seal is incorporated in a turbo-machine (not shown) such as a compressor in this example. There is shown a shaft seal 1 having a (non-rotating) sealing element or ring 2 mounted coaxially with the shaft axis (denoted by reference numeral 3), and a rotary sealing part or ring 4 located coaxially with the sealing ring 2, and therefore also with the shaft axis 3. It will he appreciated that the vertical sectional view of FIG. 1, for simplicity, shows only the portion of the shaft seal located above the shaft axis. The sealing ring 4 is mounted on an inner sleeve 5 having a radial flange 5a against which the sealing ring 4 abuts, the sleeve 5 being mounted on the shaft 6 such that the shaft 6, inner sleeve 5 and rotary sealing ring 4 co-rotate as a single rotary element. In addition, a locating sleeve 7 is bolted to inner sleeve 5. The assembly comprising components 4, 5 and 7 is prevented from displacement in one axial direction by a locating ring 21 and in the opposite axial direction by the high pressure acting inside the compressor.

The shaft seal also has a seal housing 8 and a pusher sleeve 9 disposed between a radially inward flange 8b of the seal housing 8 and sealing ring 2. The pusher sleeve has a radial flange 9b against which a plurality of biasing springs (one of which, 10, is shown in FIG. 1,) located at the same axial position in respective blind holes 11 in radially inward flange 8b and distributed about the shaft axis, act to urge the pusher sleeve 9 against the sealing ring 2. The (non-rotary) sealing ring 2 and rotary sealing ring 4 together form a contactless primary seal when the turbo-machine (or pressurized machine) is in operation, which substantially prevents fluid flow between the sealing faces of the primary seal, from the high pressure radially outer side to the low pressure radially inner side. The sealing face of sealing ring 2 has shallow grooves cut into its front surface to generate the required separation between the sealing faces of sealing rings 2, 4. Alternatively, the grooves could be formed in the rotary sealing ring 4.

Preferred designs for the grooves are given in more detail in Publish International Application WO-A-96/15397 of Dresser-Rand Company and the preferred designs for the groove are incorporated herein by reference. The sealing element 2 is normally made from carbon or other suitable material.

As shown in FIG. 1, the sealing element 2 is afforded limited axial movement against the biasing force of the springs 10. These springs provide a relatively small net biasing force so that when the shaft is rotating at normal speed, the generated separating forces cause the sealing ring 4 to separate from the sealing ring 2. The gap between these rings adjusts itself such that the generated opening forces on the one hand and the sum of the generated closing forces and the spring biasing force on the other hand are equal to one another. However, where the shaft is at rest the springs act to move the sealing ring 2 into contact with the rotary sealing ring 4.

A high-pressure gas is supplied to the radially outer edge of the seal rings 2, 4. Normally, this gas would be derived from the working fluid of the machine. However, it could instead be a clean gas suitable for venting into the atmosphere. In that event, the vented gas can be a combustible gas which is piped to burn (flare).

The high pressure at the high-pressure radial side acts around the rear face of sealing element 2 down to a so-called equilibrium balance diameter. Secondary seals 12, 13 are provided to prevent the high pressure venting around the rear face of sealing element 2 to the low-pressure radial side (atmospheric pressure). The balance diameter is determined essentially by the contact line of secondary seal 12 with the housing 8.

Figure 1A:
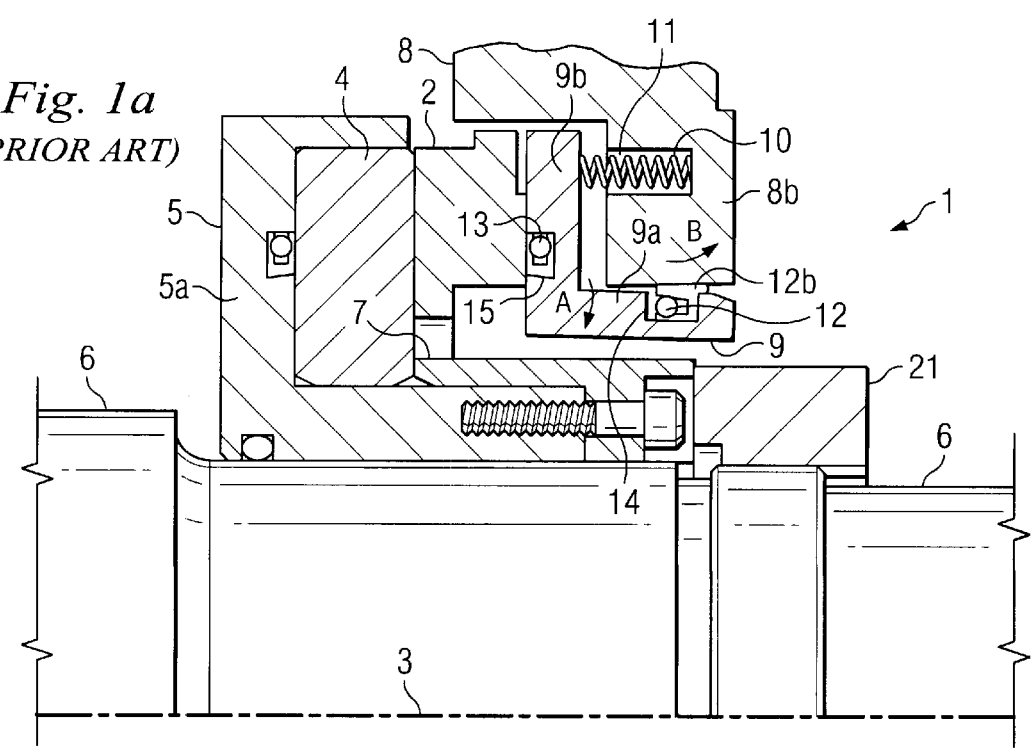

The first secondary seal 12 is provided between the pusher sleeve 9 and the radially inward flange 8b of the seal housing B. This seal can be of any suitable form, such as a conventional O-ring, or, as shown, a spring-energised U-seal. Other forms of seal are possible and the precise form selected is not material. The first secondary seal 12, as shown in FIGS. 1, 1a, is located in a channel 14 formed in the main axially-extending sleeve portion 9a of the pusher sleeve 9. This secondary seal presses sealingly against the bottom of the channel 14 formed in the main axially-extending sleeve portion 9a. It also presses sealingly against the axially-extending inner radial face of the radially inward flange 8b, thereby defining the equilibrium balance diameter for the shaft seal when operating in its equilibrium mode.

The further secondary seal 13 is provided between the rear face of sealing ring 2 and the radial flange 9b of pusher sleeve 9. Again, this secondary seal can take the form of an O-ring or, as shown, a spring-energised U-seal or Y-seal. The secondary seal 13 is located in a channel 15 formed in pusher sleeve 9. Alternatively, the channel 15 could be formed in sealing element 2.

In use of the shaft seal 1, the high-pressure working fluid of the compressor is admitted to the high-pressure radial side of the primary seal. This pressure acts on an outer annular region of the front face of the radial flange 9a of pusher sleeve 9, the outer annular region having an inner diameter defined by the line of sealing of the secondary seal 13 against the sealing ring 2 and the radially outer diameter of radial flange 9a. The high-pressure fluid also acts against the rear face of pusher sleeve 9 and down to the balance diameter. The secondary seals 12, 13 seal the applied high-pressure from the low-pressure radial side, which is at atmospheric pressure where a single shaft seal is used or, if multiple shaft seals are provided in cascade, at a lower pressure than the pressure to be sealed. Because of the pressure differential acting on the area of the rear face of radial flange 9a from the sealing diameter of the seal 13 down to the balance diameter, there is a net closing force (to the left in FIG. 1) acting on the pusher sleeve 9, against the sealing ring 2 at all times. This closing force is supplemented by the action of the biasing springs 10, and these closing forces are applied in the closing direction against sealing ring 2. In addition, the high pressure fluid acting on the front faces of sealing ring 2 produces an opening force, while the high pressure fluid acting on the rear faces down to the sealing diameter of secondary seal 13 produces a closing force. Still further, the taper-shaped surface recesses or grooves cut in the front face of sealing ring 2 (or rear face of sealing ring 4) generate separating pressure fields acting between the sealing rings 2, 4, the magnitude of the pressure fields depending on the rotational speed of the compressor shaft. The high pressure to be sealed, the depths of the recesses or grooves and the size of the gap between the sealing rings 2, 4 also influence the magnitude of the pressure fields. Whether the sealing rings 2, 4 of the shaft seal are in contact or separated depends on the magnitudes of the generated opening and closing forces, and the net spring biasing force.

When the compressor is started tap, as the rotational speed of the shaft 6 initially starts to build up, the primary seal maintains a substantially fluid-tight seal between the high-pressure and low-pressure radial sides, by virtue of sealing contact between the sealing rings 2, 4. Under these conditions, the net separating force generated by the primary seal is insufficient to overcome the sum of the spring biasing forces and the net closing force acting on the primary seal due to the applied high-pressure.

However, when the compressor shaft speed reaches a sufficient value such that the applied fluid pressure is adequate to generate a separating force that overcomes the net closing force acting on the sealing ring 2, this sealing ring will start to move away from the sealing ring 4 into an equilibrium position in which it maintains a contactless seal between the rotating sealing ring 2 and the non-rotating sealing ring 4. As described above, the secondary seals 12, 13 function at all times to prevent leakage of high-pressure fluid past the rear face of sealing ring 2 and the pusher sleeve 9.

An example of a shaft seal as described above is disclosed in WO-A-96/3335B, belonging to the present Applicant's affiliated Company Dresser-Rand Company.

Figure 2:
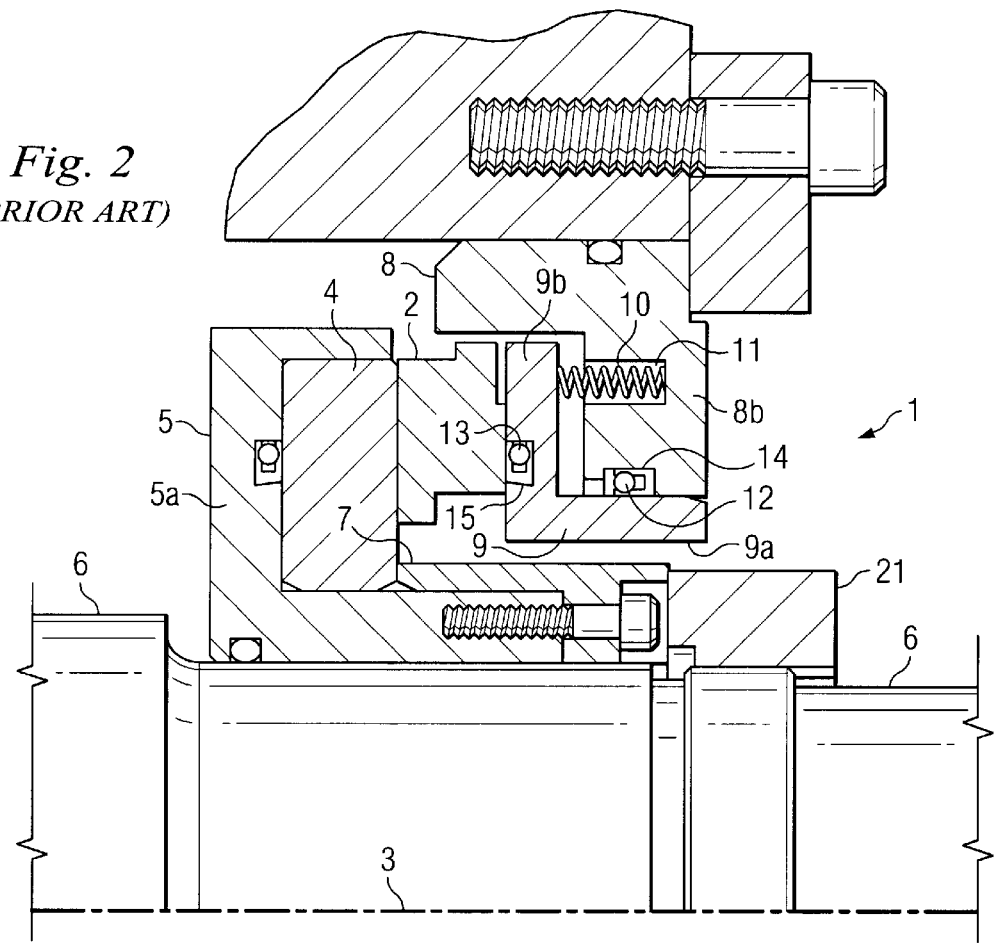

According to a known modification shown in FIG. 2, the channel 14, instead of being formed in the pusher sleeve 9, is formed in the seal housing 8. Such arrangements (but only as such) are disclosed in EP-A-0591586 of Nippon Pillar Packing Co. Ltd. and U.S. Pat. No. 5,421,593 belonging to the same proprietor.

Shaft seals of the type described above with reference to FIGS. 1 and 2 operate satisfactorily at typical sealing pressures of compressors that have been manufactured in the past. Typically, such compressors have been manufactured for compressing gases at pressures at typically from about 200 bar to about 500 bar. However, the industry is now demanding compressors to compress gas from 300 bar or more to 800 bar or more. On the other hand, it has been found that existing shaft seal designs are not adequate to withstand such inlet-pressure values, for the reasons now to be described with reference to FIGS. 1a and 2a.

Figure 2A:
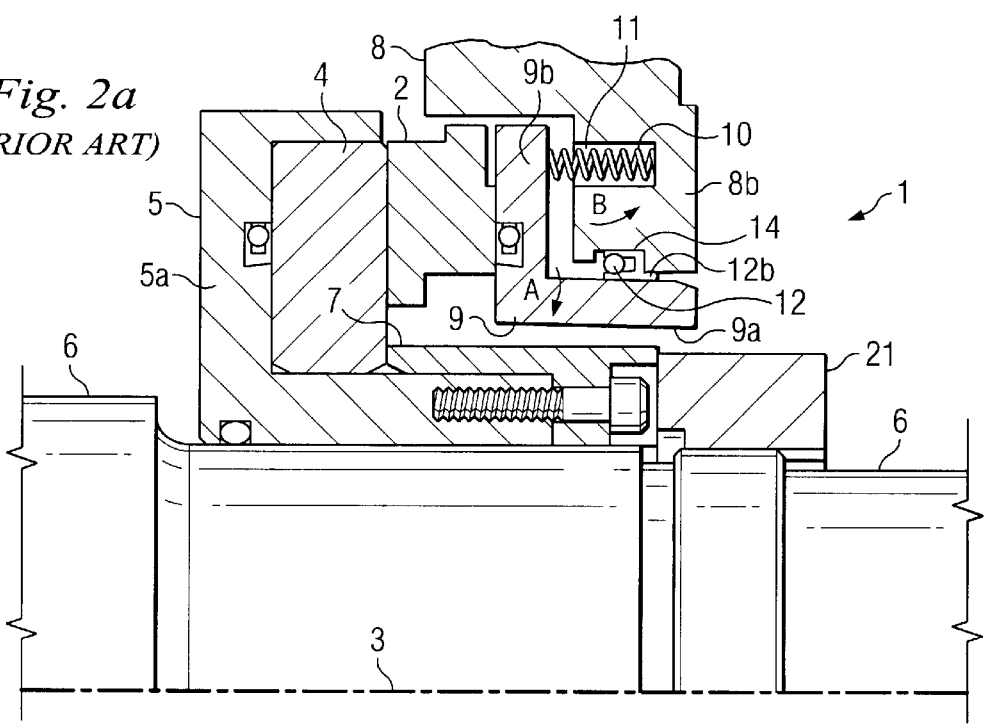

These Figures show, in deliberately exaggerated manner for the purposes of illustration, the effect of operating under such high-pressure values. As shown in these Figures, the high-pressure acting on the outer face of the axially-extending main sleeve portion 9a of the pusher sleeve 9 between the seal 12 and the junction with the rear face of the radial portion 9b deforms the main axially-extending portion inwardly with a deflection increasing with increasing axial distance in the axial direction away from the junction between the main axially-extending portion and the radial flange 9a. This torsional deformation is indicated by letter A in FIG. 1a. Correspondingly, the high pressure acting against the inside (front) face of radially inner flange 8b torsionally deforms that flange rearwardly, as indicated by arrow B. The consequence is that, as shown in FIGS. 1a, 2a, the very small gap normally existing between the inner face of the radially inward flange 8b of the seal housing 8 and the outer face of the main axially-extending sleeve portion 9a of the pusher sleeve 9 is enlarged. With increasing high-pressure acting against the secondary seal 12 and widening the gap between the flange 8b and main sleeve portion of the pusher sleeve 9, a bead 12b starts to form as the secondary seal 12 starts to be extruded through the widening gap. When there is no such bead on the secondary seal 12, this seal offers little frictional resistance to the rearward axial sliding of the pusher sleeve 9. However, when the bead 12b starts to form, the frictional resistance increases, potentially significantly and even to the point where the pusher sleeve can become united with the housing 8. Furthermore, as the bead 12b continues to growl an increasingly unstable situation can develop whereby the sealing ability of the secondary seal 12 is progressively lessened due to the continuing extrusion, until eventually an unstable situation is reached in which the seal 12 is expelled or blown out through the gap, resulting in failure of the shaft seal. It is noted that the bead 12b does not normally form around the entire rear circumferential region of the secondary seal 12 but generally only at a single angular position about the seal circumference.

One possible solution to this problem that has been considered is to minimise the gap existing between the radial flange 8b and the pusher sleeve 9 when the shaft seal is nor in use, but there is a limit to how much this gap can be reduced because the pusher sleeve 9 must be free to undergo limited axial movement when the shaft seal is not in operation. Furthermore, radially inward deflection of the main sleeve portion of the pusher sleeve 9 is inevitable, yet this sleeve must not be allowed to come into contact with the (rotating) shaft inner sleeve 5 under full operating pressure.

Another potential solution which has been considered is to use harder materials for forming the sealing parts of the secondary seal 12, or to use back-up rings of harder material than the sealing parts themselves of the secondary seal. However, there is a limit to how hard the selected materials can be, particularly since harder materials are less effective to provide the required sealing effect and they also increase the friction forces generated.

Spring energised polymer seals have been proposed. However, the operating pressure at which beads start to form on such seals is about 200–250 bar.

The present invention seeks to provide a shaft seal which is improved in the above respects and can withstand high operating pressures, in the range from zero bar to 300 bar or more. It relates to a shaft seal as initially defined and is characterised by an auxiliary sleeve disposed around the pusher sleeve coaxially therewith and maintained in sealing contact with the pusher sleeve by the first sealing member, the auxiliary sleeve being arranged to be urged in an axial direction by fluid pressure acting at the high pressure radial side to form a tertiary seal.

Because the fluid high-pressure acting on the auxiliary sleeve produces a net radially inwards force, it can be arranged that the small gap existing between the pusher and auxiliary sleeves when no fluid pressure is applied to the shaft seal will not enlarge to the extent that occurs in the prior art shaft seals disclosed with reference to FIGS. 1, 1a and 2, 2a. Therefore, there is a reduced tendency for appreciable frictional resistance to develop between the first sealing member and the seal housing, or for the first sealing member to be expelled under high-pressure operation.

The function of the tertiary seal is merely to maintain sealing contact between the seal housing and auxiliary sleeve. Ideally, the geometry, material and design of the auxiliary sleeve is such that the distortion of the auxiliary sleeve substantially matches that of the pusher sleeve under fluid pressure, so that the gap between these two elements remains substantially the same irrespective of the fluid pressure acting, thereby avoiding or minimising the risk of a bead forming on the first sealing member.

Preferably, said channel in which said first sealing member is located is formed in the pusher sleeve. This maximises the closing force acting on the pusher sleeve when operating under high fluid pressure, because then the seal provided by the first sealing member against the pusher sleeve is located at a radially inward location. Alternatively, said channel in which said first sealing member is located may be formed in the auxiliary sleeve.

Preferably, the biasing means acts between the pusher sleeve and the auxiliary sleeve. This arrangement guarantees that the sealing effect of the tertiary seal is kept integral at all times, so that when the fluid pressure is applied it is prevented from passing unrestrictedly past the auxiliary sleeve to the low-pressure radial side. However, it is alternatively possible for the biasing means to act between the seal housing and the pusher sleeve, because it is considered that when the high fluid pressure is applied at the high-pressure radial side, the auxiliary sleeve will, as a result of the location of the tertiary seal, be urged in the axial direction, ensuring that the tertiary seal performs its required sealing function. In its simplest form, the tertiary seal is provided by face-to-face contact between transverse faces of the auxiliary sleeve and seal housing, when the shaft seal is in use. However, it is preferred that a separate tertiary seal is provided, for greater sealing integrity.

Suitably, the tertiary seal comprises an O-ring located in a channel formed in the transverse end face of the auxiliary sleeve. In accordance with a modification, the tertiary seal comprises an O-ring located in a channel formed in the transverse end face of the seal housing. Alternatively, it can comprise a spring-energised U-seal or Y-seal.

Normally, the pusher sleeve will comprise a main axially-extending portion with a radial flange at one end in contact face-to-face with the sealing element. This design for the pusher sleeve is preferred because then the main axially-extending portion can serve to provide for accommodating the required limited axial movement of the pusher sleeve while the first sealing member maintains sealing contact with the auxiliary sleeve, and the radial flange conveniently serves to receive the bias force of the biasing means and apply it against the sealing element. Furthermore, the flange substantially resists radially inward distortion of the pusher sleeve at the one axial end of the pusher sleeve. When the pusher sleeve has this preferred form, the auxiliary sleeve preferably similarly comprises a main axially-extending portion with a radial flange at one end facing the flange of the pusher sleeve. This arrangement for the auxiliary sleeve helps to ensure that its distortion under pressure closely conforms with that of the pusher sleeve.

In another arrangement, the pusher sleeve is of the same construction, but the auxiliary sleeve is in the form of a sleeve over its entire length. Then, when the shaft seal is in use, the high fluid pressure acting on the outside of the low-pressure axial end portion of the auxiliary seal beyond the sealing location of the first sealing member will deflect that end portion inwardly, again reducing the likelihood of the first sealing member being blown out of the shaft seal.

Additionally, a further secondary seal may be provided between adjacent radial surfaces of said sealing ring and said pusher sleeve.

The tertiary seal can be provided by a lip formed integrally on and protruding from one of said seal housing and said auxiliary sleeve, said lip sealingly contacting the other of said seal housing and said auxiliary sleeve. Further, said secondary seal between said sealing ring and said pusher sleeve may be provided by a lip formed integrally on and protruding from one of said pusher sleeve and said sealing ring, said lip being maintained sealingly in contact with the other of said pusher element and said sealing ring.

The preferred arrangements in which a lip is provided to form a direct contact seal between the pusher sleeve and the sealing ring, or between the auxiliary sleeve and the seal housing, respectively, avoid the use of separate sealing members, and hence result in constructional simplification and lower cost.

In one preferred arrangement, the pusher sleeve comprises an inner pusher sleeve element and an outer annular pusher disc, the inner pusher sleeve element and the outer pusher disc having respective radial surfaces maintained in contact with one another.

Alternatively, or in addition, the auxiliary sleeve comprises an inner auxiliary sleeve element and an outer annular auxiliary disc, the inner auxiliary sleeve element and the outer annular auxiliary disc having respective radial surfaces maintained in contact with one another.

In this way, torsional forces acting in the region of the junction of the axially extending portion and the forward radial portion of both the one-part pusher sleeve and the one-part auxiliary sleeve are largely eliminated.

The shaft seal may be incorporated in a turbo-machine or other pressurized machine, though for convenience the description which follows relates to the specific case of a compressor, as in the prior art examples described with reference to FIGS. 1, 1*a* and 2, 2*a*.

Figure 3:
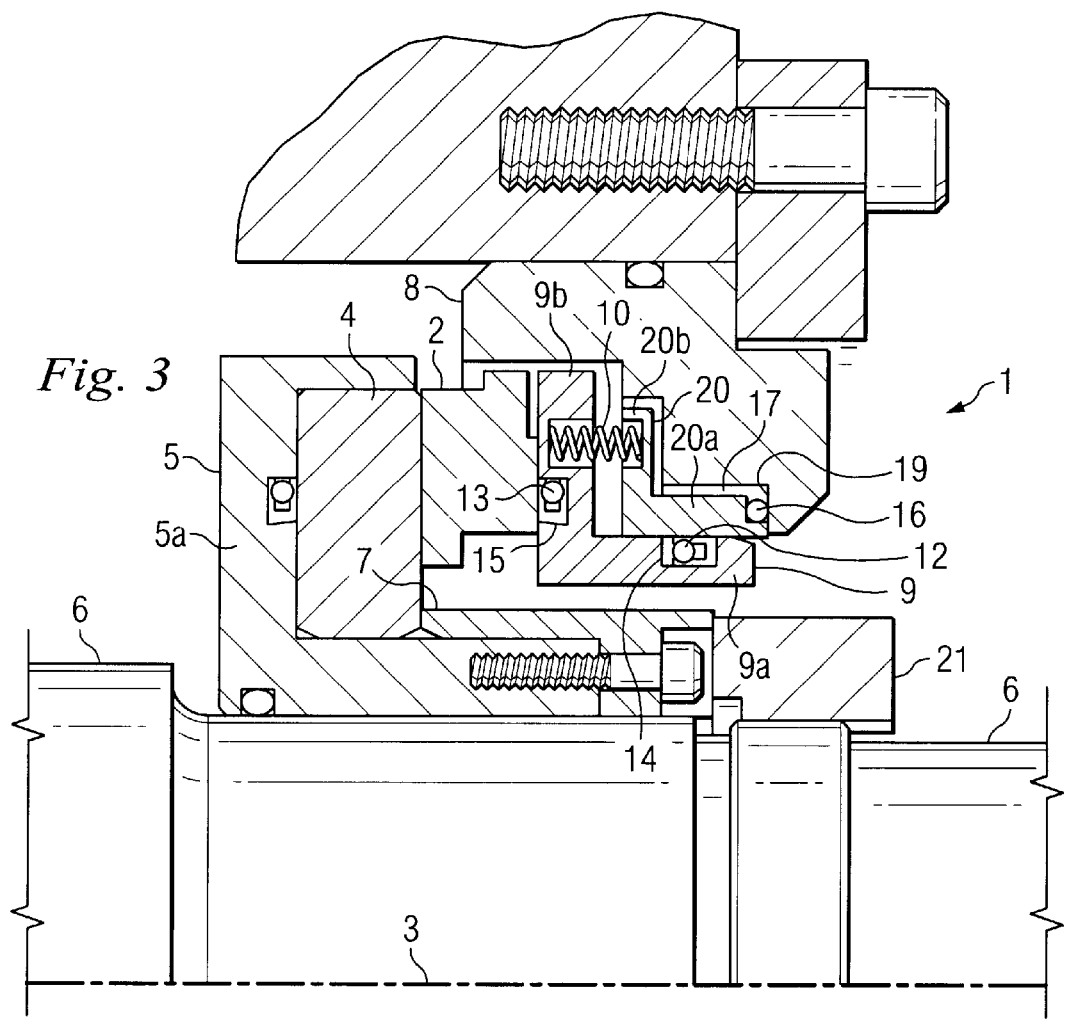
Figure 3A:
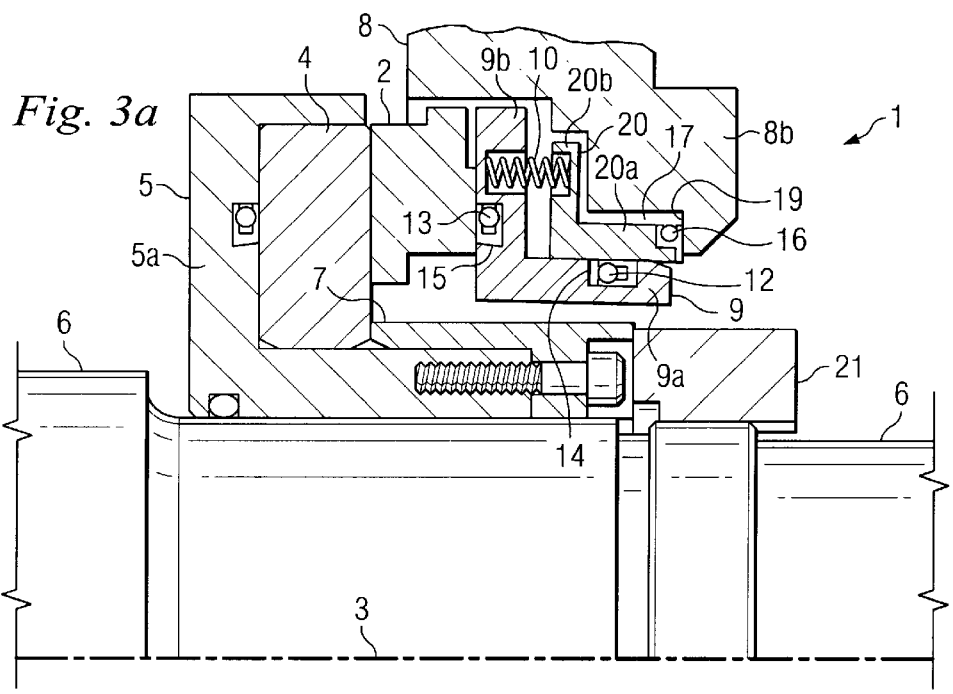
Figure 3B:
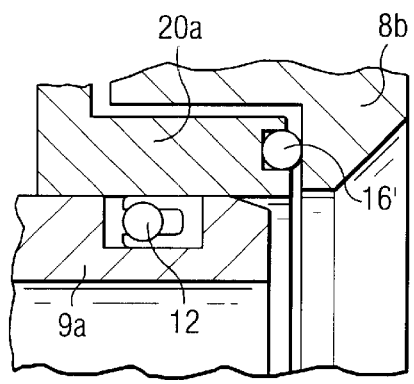
Figure 3C:
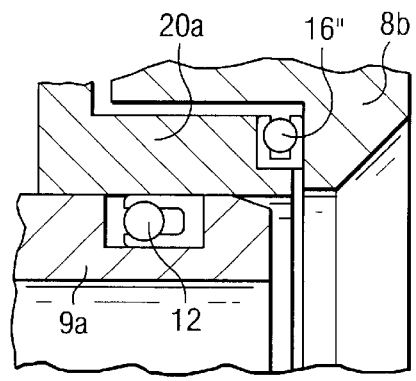

For a better understanding of the invention and to show how the same may be carried into effect, reference will now be made, by way of example, co the accompanying drawings in which:

FIG. 1 is a partial longitudinal sectional view through a first known shaft seal showing the relevant structural elements of the seal;

FIG. 1*a* is an enlarged view of part of the seal, showing the distortion of certain structural elements in an exaggerated manner for illustrative purposes;

FIGS. 2, 2*a* are corresponding views to FIGS. 1, 1*a* for a modified known arrangement;

FIGS. 3, 3*a* are corresponding views to FIGS. 1, 1*a*, respectively, of a first embodiment of the invention;

FIGS. 3*b*, 3*c* respectively show, on an enlarged scale, alternative forms of tertiary seal to that incorporated in the embodiment according to FIGS. 3, 3*a;*

Figure 4:
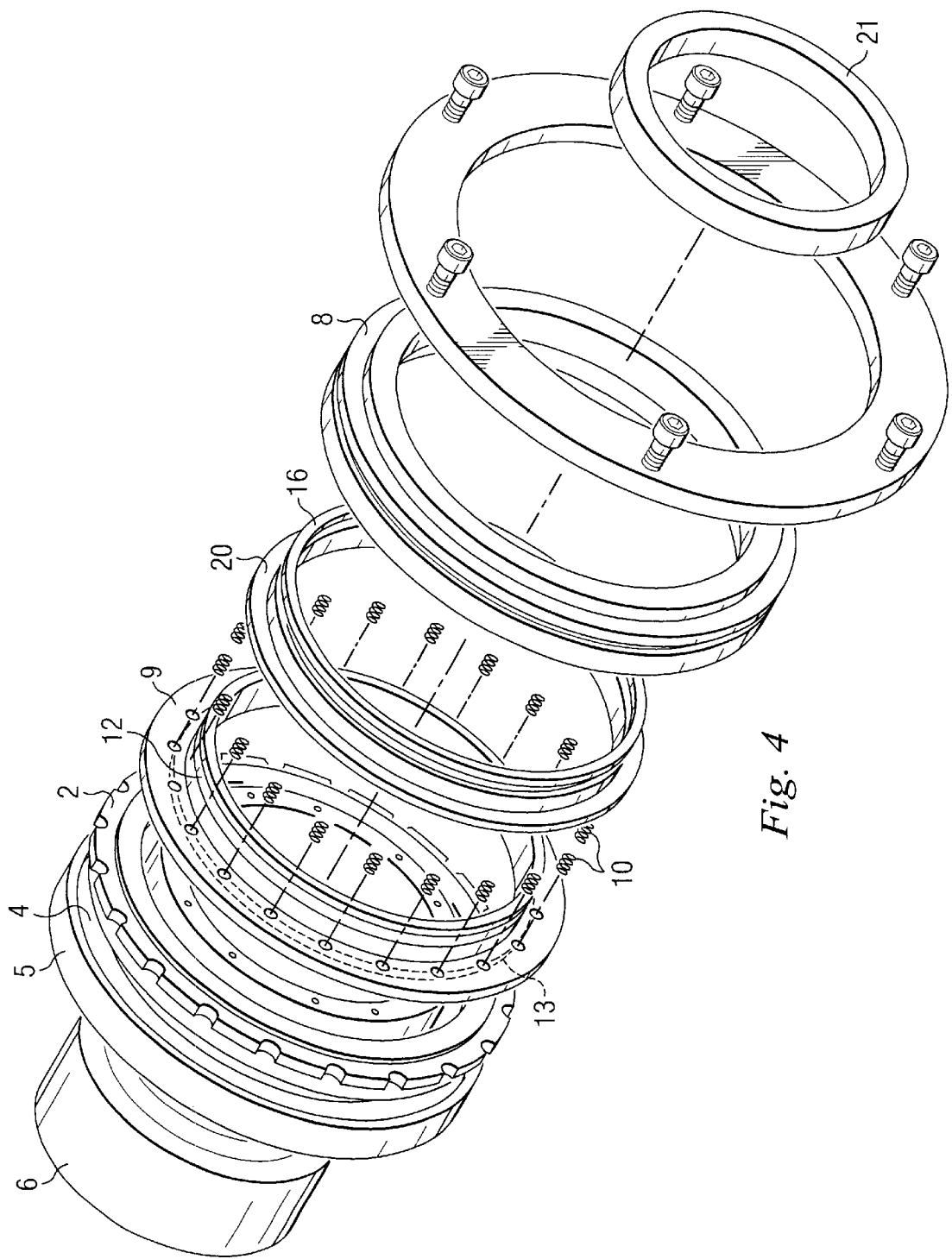
Figure 5:
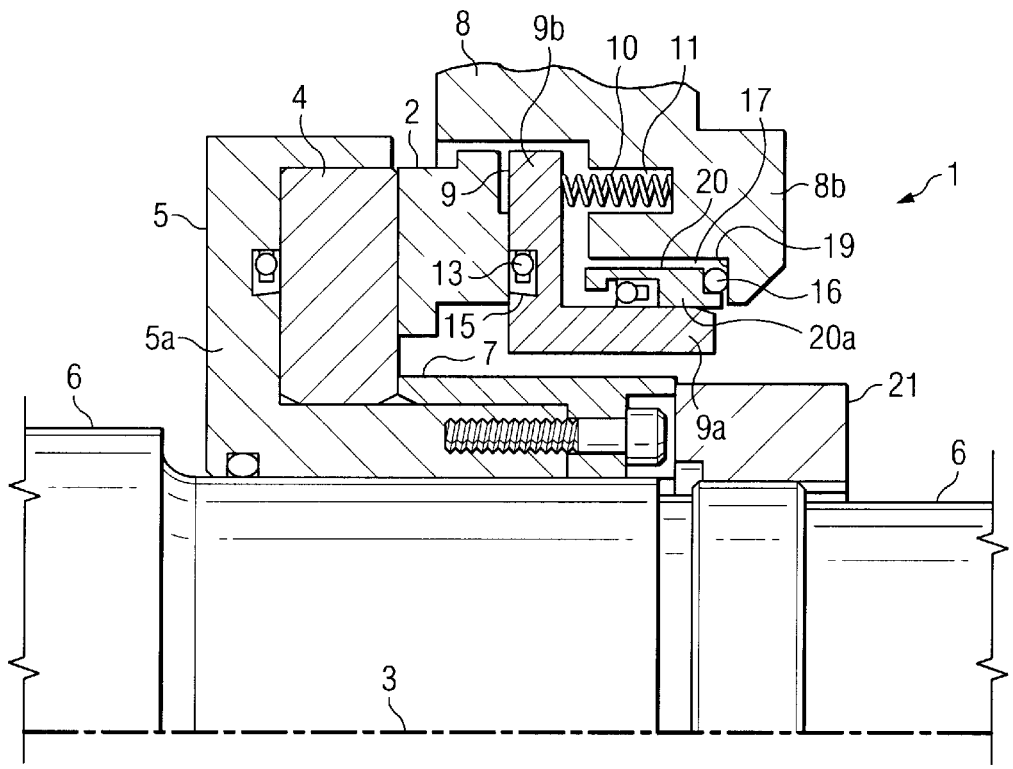
Figure 5A:
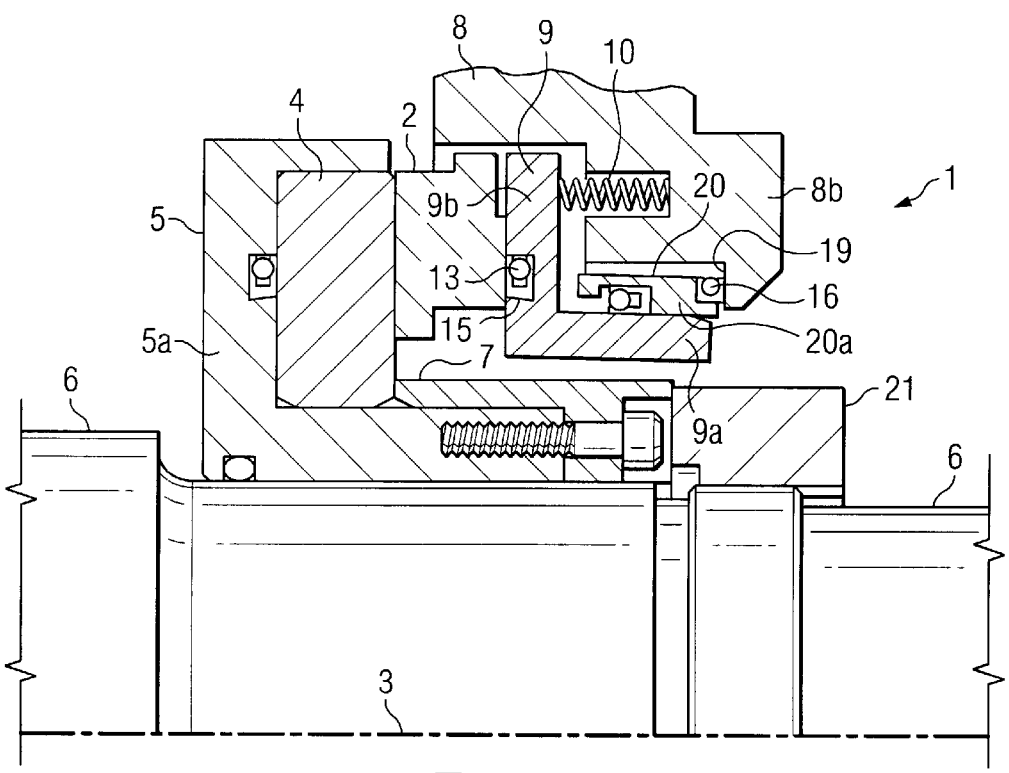
Figure 6:
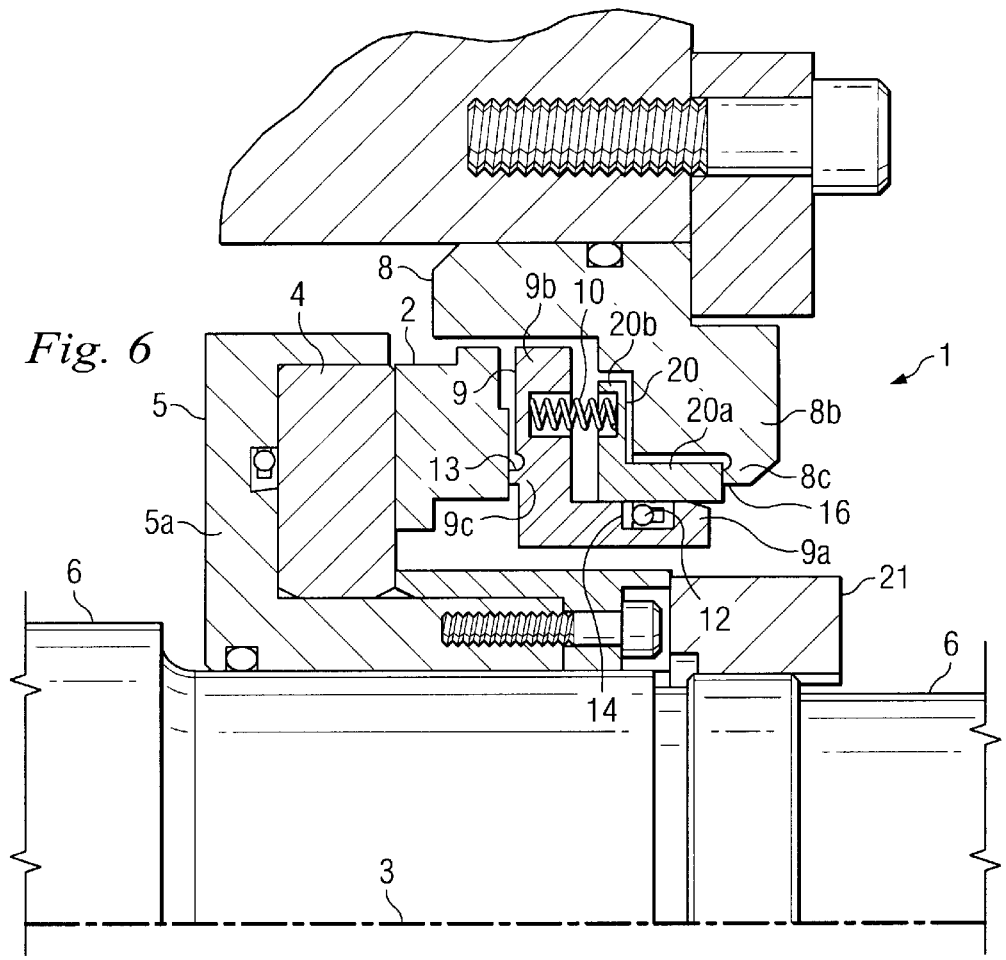
Figure 6A:
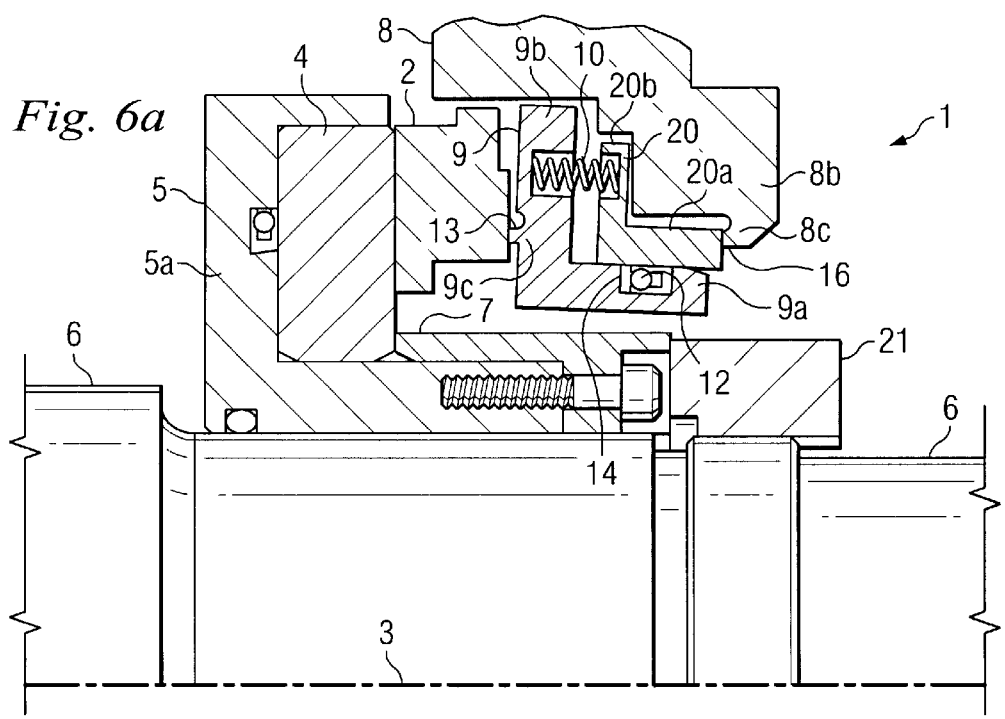
Figure 7:
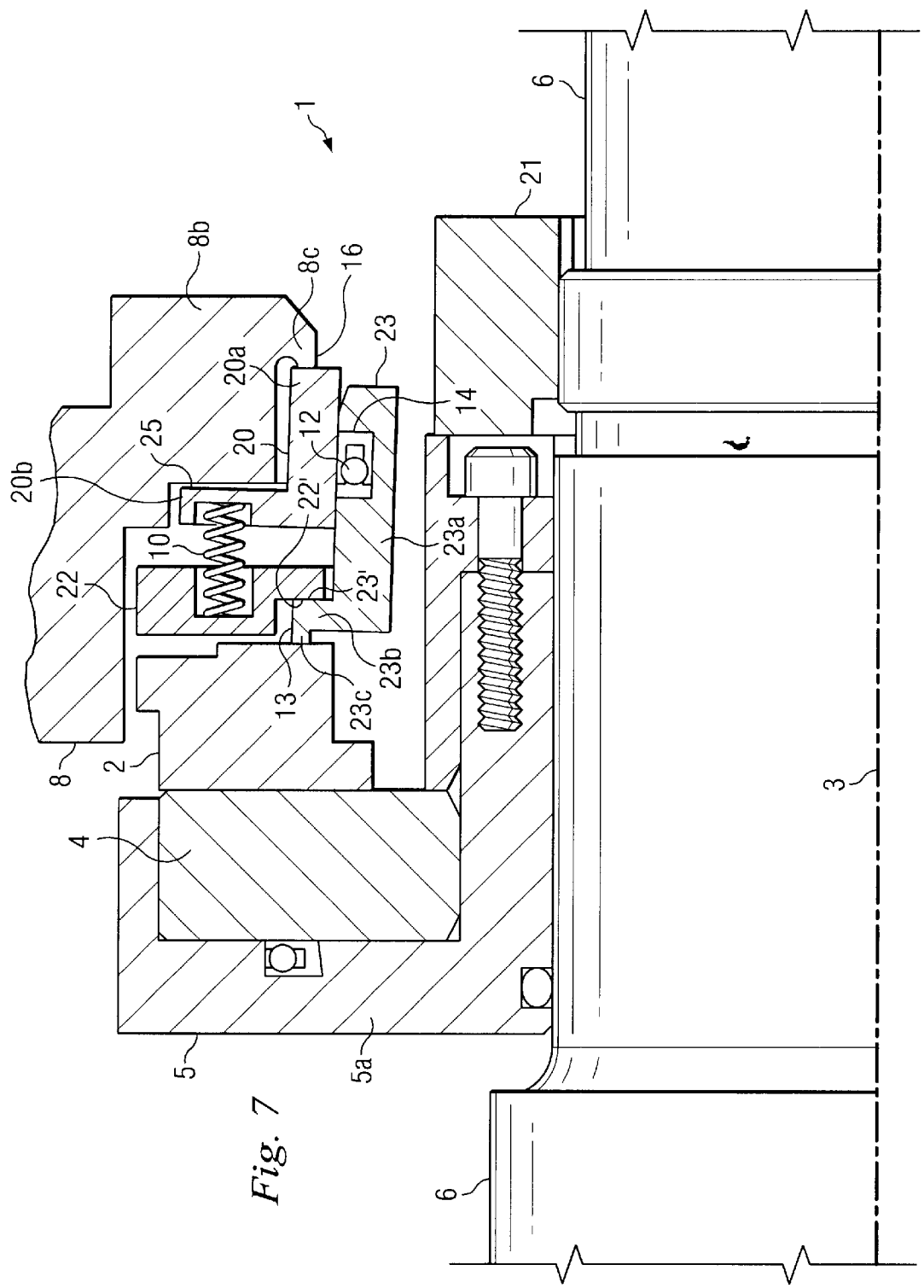
Figure 8:
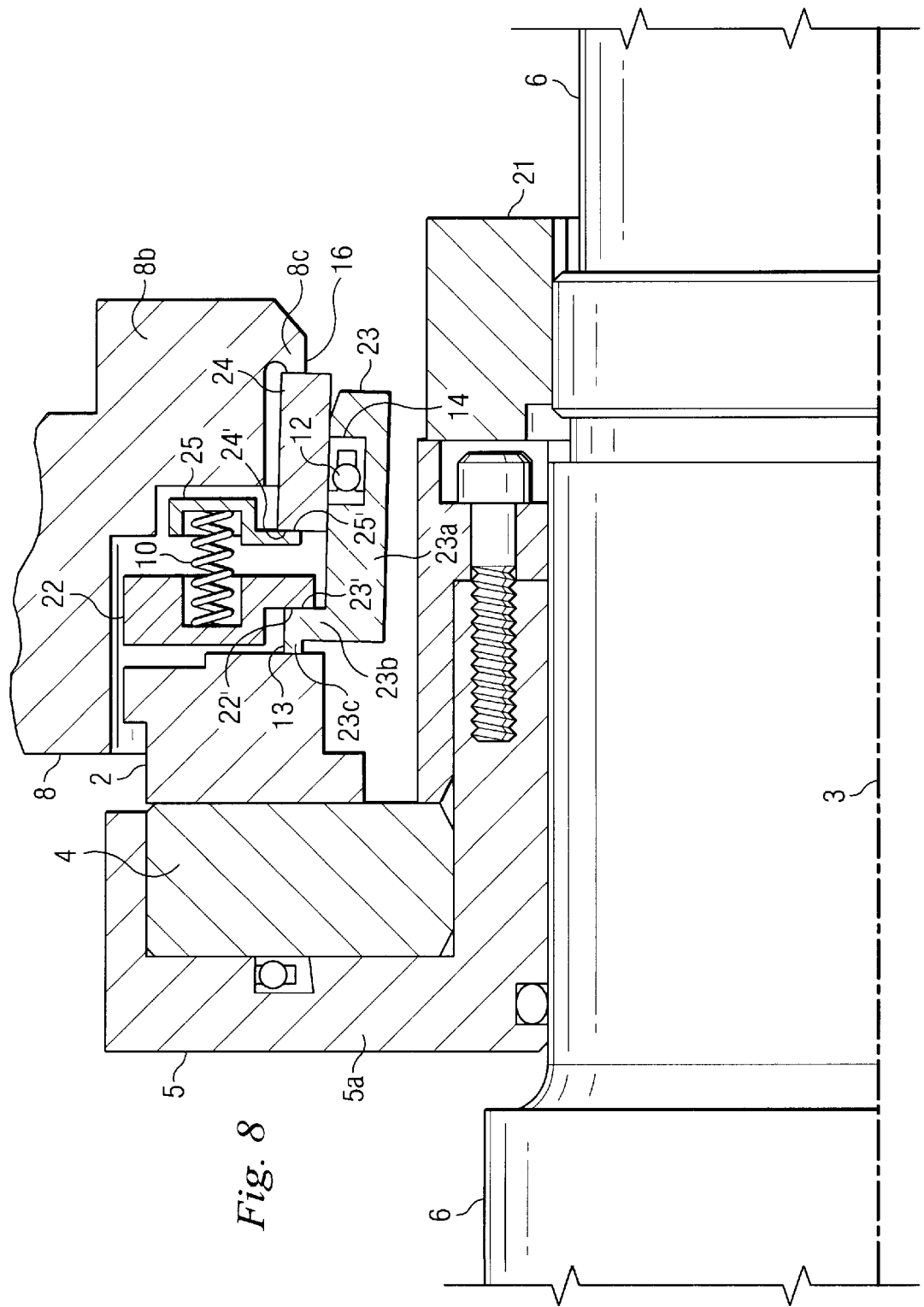

FIG. 4 is an exploded view of the shaft seal according to the first embodiment;

FIGS. 5, 5*a* are corresponding views to FIGS. 3, 3*a*, respectively, of a second embodiment of the invention;

FIGS. 6, 6*a* are corresponding views to FIGS. 3, 3*a* respectively of a third embodiment of the invention;

FIG. 7 is a view corresponding to FIG. 3*a*, showing a fourth embodiment of the invention; and FIG. 8 is a view corresponding to FIG. 3*a*, showing a fifth embodiment of the invention.

The shaft seals illustrated in FIGS. 3 and 4, 5 FIG. 5, and FIGS. 6, 7 and 8 are identical to that described above with reference to FIG. 1, except in the respects described below. To the extent that the construction is the same, this is indicated by the use of identical reference numerals.

The shaft seal 1 additionally comprises an auxiliary sleeve 20 disposed around the pusher sleeve 9 co-axially therewith, with a small gap radially separating the two sleeves 9, 20 and located within a recess 17 within the radially inner flange 8*b*. The auxiliary sleeve comprises a main axially-extending sleeve portion 20*a* having at one end a radial flange 20*b* facing the rear face of the radial flange 9*b* of the pusher sleeve 9. The biasing springs 10 act between the flanges of 9*b*, 20*b* of the pusher sleeve 9 and auxiliary sleeve 20, thereby urging the auxiliary sleeve further into the recess 17 in the seal housing 8. A tertiary seal 16 provides a substantially fluid-type seal between the transverse rear-facing end face of the sleeve portion 20*a* and an adjacent forwardly-facing, transverse annular face 19 of the seal housing. As shown, this seal is preferably in the form of a spring energized Y-seal. Alternatively, it can be an O-ring 16' located in a channel formed in the sleeve portion 20*a* (see FIG. 3*b*) or in the radially (inward flange 8*b* of the seal housing, or in a spring energised U-seal 16" (see FIG. 3*c*) or a spring-energised Y-seal. The first secondary sealing member 12 provides a substantially fluid-tight seal between the auxiliary sleeve and the pusher sleeve 9.

FIG. 4 is an exploded view of the shaft seal, giving a clear indication of the geometry of the respective elements of the shaft seal. This Figure also shows the modification in which the taper shaped grooves are formed in the sealing face of rotary sealing ring 4, rather than of the non-rotating sealing ring 2.

In use of the shaft seal, the high pressure fluid acting at the high-pressure fluid side of the primary seal acts, just as in the cease of the known shaft seals according to FIGS. 1, 1*a* and 2, 2*a*, against the pusher sleeve 9 to cause the axially-extending sleeve portion to deflect radially inwardly. The distortion of the axially extending sleeve portion is progressive from the axial location of secondary seal 12 along the length of the pusher sleeve, because of the pressure differential between the inside and outside pressures acting on main sleeve portion 20a. The flange 9b substantially resists distortion of the pusher sleeve in the region of that end. The maximum inward radial distortion occurs at the other end.

However, in the present embodiment, as shown in FIG. 3b, the high fluid pressure acting on the auxiliary sleeve, in particular around its external surface, similarly distorts the auxiliary sleeve 20. Therefore, the small gap existing between the outer surface of the pusher sleeve 9 and the inner surface of the auxiliary sleeve 20 does not change much, thereby avoiding or at least minimising the possibility of the high-pressure acting on the secondary seal 12 from causing the seal to be extruded into the gap. Therefore, even when operating under higher pressures e.g. upwards of 300 bar, the secondary seal 12 will not start to offer high frictional resistance to the sliding action of the pusher sleeve, nor be expelled or blown out of the channel 14 in the pusher sleeve 9.

It is preferred to design the auxiliary sleeve 20 such that the gap between it and the pusher sleeve 9 remains substantially constant irrespective of the pressure which is acting at the high pressure radial side. This result can be achieved by appropriate choice of the geometry and relative dimensions of the auxiliary sleeve 20 and pusher sleeve 9, and by suitable choice of the materials from which these two components are made. Preferably, the radial and toroidal stiffnesses of the auxiliary sleeve 20 are the same as those of the pusher sleeve 9. It is also preferred that the materials from which the auxiliary sleeve 20 and pusher sleeve 9 are made are the same, so that the gap between those two components remains substantially invariant. Irrespective of temperature changes.

The embodiment according to FIG. 5 shows two possible modifications which may be adopted singly or in combination.

The first modification, merely involves accommodating the secondary sealing member 12 in a channel 14 formed in the auxiliary sleeve 20, rather than in the pusher sleeve 9.

The second modification is that the springs 10 do not act at one end against the auxiliary sleeve 20, but merely function to urge the pusher sleeve 9 against the sealing ring 2. Nevertheless, it is still considered with this arrangement that adequate sealing performance is provided by the tertiary seal 16, because, when the high pressure fluid is acting at the high-pressure radial side, it will produce a net axial force acting to urge the auxiliary sleeve 20 against the radially inward flange 8b of the seal housing 8, due to the locations of the secondary seal 12 and the tertiary seal 16 on the auxiliary sleeve.

It is pointed cut that in the embodiment according to FIG. 5, the auxiliary sleeve 20 does not have any end flange as in the FIGS. 3 and 4 embodiment, but is in the form of a sleeve over its entire axial extent. Because of the sealing function of the secondary seal 12, the internal and external forces acting on the axial portion of the auxiliary sleeve at the high pressure axial side of the secondary seal 12 balance each other, whereas there is a net inward radial force acting on the portion of the auxiliary sleeve at the low-pressure axial side of the secondary seal 12, which distorts the auxiliary seal inwardly towards the axially extending sleeve portion of pusher sleeve 9. This distortion produces the effect of minimising the gap between the pusher and auxiliary sleeves on the low-pressure fluid side of seal 12, thereby minimising the likelihood of the seal 12 being expelled.

FIG. 6 shows another embodiment of the invention. In this modification, no tertiary seal 16 such as shown in FIG. 3a is provided by a separate sealing member. Instead, the tertiary seal is provided by direct sealing contact between a front face of a lip 8c formed integrally with the seal housing 8 and protruding axially and forwardly from the radially inward flange 8b of the seal housing 8, and the rear face of the axially extending portion 20a of auxiliary sleeve 20. Alternatively, the lip can be formed integrally on and protrude rearwardly from the axially extending portion 20a of auxiliary sleeve 20, to seal against a transverse front face of the radially inward flange 8b. In a similar way, the use of a secondary seal 13 in the form of a separate component as in the FIGS. 3, 3a embodiment is avoided by providing a lip 9c, protruding forwardly from the front face of and formed integrally with the radial flange 9b of plusher sleeve 9 as shown in FIG. 6, the lip being in direct sealing contact with the rear face of sealing ring 2. Alternatively, the lip 9c can be formed integrally on the rear face of the sealing ring 2 and protrude rearwardly to seal against the front face of the radial flange 9b of the pusher sleeve 9. FIG. 6a shows the shaft seal under working conditions.

A fourth embodiment of the invention shown in FIG. 7 is a modification to the pusher sleeve 9 of the third embodiment. In this modified embodiment, the pusher sleeve, which is a single-part component, is replaced with a two-part pusher sleeve, comprising an inner pusher sleeve element 23 with an axially extending portion 23a and a radial flange 23b at the front end of axially extending portion 23a, and an outer annular pusher disc 22, the pusher disc being coaxially disposed around the inner pusher sleeve 23. A front face 22' of an inner radial portion of the pusher disc 22 is maintained sealingly in contact with the rear face 23' of the radial flange 23b. The pusher sleeve 23 seals against the sealing ring 2 through a lip 23c protruding forwardly from the front face of radial flange 23b, the lip being formed integrally with the radial flange 23b and in direct contact with the rear face of sealing ring 2. Alternatively, the lip can be formed integrally on the rear face of the sealing ring 2 and protrude rearwardly to seal against a front face of radial flange 23b.

One advantage of a two-part pusher sleeve is that torsional forces, as encountered in the region of the junction between the radial portion 9b and the axially extending portion 9a of the single-component pusher sleeve 9, when the shaft seal is in operation, are largely eliminated.

A fifth embodiment of the invention shown in FIG. 8 is a modification to the fourth embodiment. In the fifth embodiment, the auxiliary sleeve 20, which is a single-part component, is replaced by a two-part auxiliary sleeve comprising an inner auxiliary sleeve element 24 and an outer annular auxiliary disc 25. The outer annular auxiliary disc is coaxially disposed around the inner auxiliary sleeve element 24 at its forward end, and the inner auxiliary sleeve element and the outer annular auxiliary disc have respective front and rear radial surfaces 24' and 25' sealingly maintained in contact with one another.

In another embodiment, the pusher sleeve is of one-part construction (such as described with reference to FIGS. 6, 6a) and the auxiliary sleeve is of two-part construction (such as described with reference to FIG. 8).

As in the case of the two-part pusher sleeve of the fourth embodiment, an advantage of replacing the single-component auxiliary sleeve with a two-part auxiliary sleeve is that torsional forces, as encountered in the region of the junction between the radial flange 20b and the axially extending portion 20a of the single-component auxiliary sleeve 20 when the shaft seal is in operation, are largely eliminated. Also, when in operation, the two-part auxiliary sleeve deforms in a compliant manner with the deformation of the pusher sleeve.

Under normal operating conditions as shown in FIGS. 6a, 7 and 8, the force acting on the lip seals 8c, 23c due to the very high fluid pressure acting within the compressor is very large due to the relatively small contact area of the lip seals, and thus a substantially fluid-tight seal is maintained.

The lip seal arrangements used in the embodiments shown in FIGS. 6, 6a, 7 and 8 avoid the use of separate sealing members serving as the secondary seal 13 and the tertiary seal 16 according to the embodiment shown in FIGS. 3, 3a. This results in a constructional simplification and hence lower cost.

As an alternative to the biasing spring 10, a wave spring for example in the form of a single annulus of suitable sheet material, e.g. metal, (or several stacked together) may be deformed so as to form successive undulations at different angular positions about the axis of the annulus. The deformed annulus is compressed between the primary sealing ring 2 and the auxiliary sleeve 20 or radially inward flange 8b (as the case may be), thereby providing the required biasing action in the manner of a leaf spring.

In the described embodiments, the source of the high-pressure fluid is the working fluid of the compressor, whose pressure accordingly increases with increasing compressor operating speed. Where a separate source of high-pressure fluid from the working fluid is used, its pressure will normally be held at a given delivery pressure. When the compressor is at rest, the net force acting on the primary seal is preferably a closing force, maintaining the sealing ring 2 against the sealing ring 4. However, when the compressor has speeded up sufficiently, the separating force generated by the tapered grooves or recesses in the one sealing ring or the other of the primary seal is sufficient to separate the two rings. Therefore, the operation is essentially the same as in the case where the working fluid of the compressor is the source of the high-pressure fluid. Although it is preferred in this embodiment that the sealing ring 2 is held against the sealing ring 4 when the compressor is at rest, it is possible for the shaft seal to be slightly open under rest conditions, since the essential requirement is merely that the shaft seal provides contactless operation when the compressor is operating at normal operational speed.

What is claimed is:

1. A shaft seal comprising a sealing element; a rotary sealing part mounted coaxially with the sealing element and forming therewith a contactless primary seal between opposed faces of the sealing element and rotary sealing part to substantially prevent fluid flow across the primary seal from a high pressure radial side to a low-pressure radial side; a seal housing; a pusher sleeve disposed between the seal housing and the sealing element, coaxially with and in contact with the sealing element and comprising an inner pusher sleeve element and an outer annular pusher disc, said pusher sleeve element and said pusher disc having respective radial surfaces maintained in contact with one another; biasing means urging the pusher disc away from the seal housing and against the sealing element to urge the sealing element axially towards the rotary sealing part; and a first sealing member disposed about the pusher sleeve element and located in a channel in communication with the high-pressure radial side to provide a secondary seal between the high-pressure and low-pressure radial sides; and an auxiliary sleeve disposed around the pusher sleeve element coaxially therewith and maintained in sealing contact with the pusher sleeve element by the first sealing member, the auxiliary sleeve being arranged to be urged in an axial direction by fluid pressure acting at the high-pressure radial side to form a tertiary seal between the auxiliary sleeve and seal housing.

2. A shaft seal according to claim 1, wherein said channel is formed in the pusher sleeve element.

3. A shaft seal according to claim 1, wherein said channel in which said first sealing member is located is formed in the auxiliary sleeve.

4. A shaft seal according to claim 1, wherein the biasing means acts between the pusher disc and the auxiliary sleeve.

5. A shaft seal according to claim 2, wherein the biasing means acts between the seal housing and the pusher disc.

6. A shaft seal according to claim 1, wherein the tertiary seal is provided by face-to-face contact between transverse faces of the auxiliary sleeve and seal housing.

7. A shaft seal according to claim 1, further comprising an additional secondary seal between adjacent radial surfaces of said sealing ring and said pusher sleeve element.

8. A shaft seal according to claim 7, wherein said additional secondary seal is provided by a lip formed integrally on and protruding from one of said pusher sleeve element and said sealing ring, said lip being maintained sealingly in contact with the other of said pusher sleeve and said sealing ring.

9. A shaft seal according to claim 1, wherein said tertiary seal is provided by a lip formed integrally on and protruding from one of said seal housing and said auxiliary sleeve, said lip sealingly contacting the other of said seal housing and said auxiliary sleeve.

10. A shaft seal comprising a sealing element; a rotary sealing part mounted coaxially with the sealing element and forming therewith a contactless primary seal between opposed faces of the sealing element and rotary sealing part to substantially prevent fluid flow across the primary seal from a high pressure radial side to a low-pressure radial side; a seal housing; a pusher sleeve disposed between the seal housing and the sealing element, coaxially with and in contact with the sealing element; biasing means urging the pusher sleeve away from the seal housing and against the sealing element to urge the sealing element axially towards the rotary sealing part; a first sealing member disposed about the pusher sleeve and located in a channel in communication with the high-pressure radial side to provide a secondary seal for the pusher sleeve between the high-pressure and low-pressure radial sides; and an auxiliary sleeve disposed around the pusher sleeve coaxially therewith and maintained in sealing contact with the pusher sleeve by the first sealing member, the auxiliary sleeve comprising an inner auxiliary sleeve element and an outer annular auxiliary disc, said inner auxiliary sleeve element and said outer annular auxiliary disc having respective radial surfaces maintained in contact with one another, the auxiliary sleeve being arranged to be urged in an axial direction by fluid pressure acting at the high-pressure radial side to form a tertiary seal between the auxiliary sleeve and seal housing.

11. A shaft seal according to claim 10, wherein said channel is formed in the pusher sleeve.

12. A shaft seal according to claim 10, wherein said channel is formed in the auxiliary sleeve.

13. A shaft seal according to claim 10 wherein the biasing means acts between the pusher sleeve and the auxiliary sleeve.

14. A shaft seal according to claim 10, wherein the biasing means acts between the seal housing and the pusher sleeve.

15. A shaft seal according to claim 10, wherein the tertiary seal is provided by face-to-face contact between transverse faces of the auxiliary sleeve and seal housing, when the shaft seal is in use.

16. A shaft seal according to claim 10, wherein the tertiary seal comprises an O-ring located in a channel formed in the transverse end face of the auxiliary sleeve.

17. A shaft seal according to claim 10, wherein the tertiary seal comprises an O-ring located in a channel formed in the transverse end face of the seal housing.

18. A shaft seal according to claim 10, wherein the tertiary seal comprises a spring-energized U-seal.

19. A shaft seal according to claim 10, wherein the tertiary seal is a spring-energized Y-seal.

20. A shaft seal according to claim 10, wherein the pusher sleeve comprises a main axially extending portion with a radial flange at one end in face-to-face contact with the sealing element.

21. A shaft seal according to claim 10, wherein the pusher sleeve comprises a main axially extending portion with a radial flange at one end in face-to-face contact with the sealing element and the auxiliary sleeve is in the form of a sleeve over its entire length.

22. A shaft seal according to claim 10, further comprising an additional secondary seal between adjacent radial surfaces of said sealing ring and said pusher sleeve.

23. A shaft seal according to claim 22, wherein said additional secondary seal is provided by a lip formed integrally on and protruding from one of said pusher sleeve and said sealing ring, said lip being maintained sealingly in contact with the other of said pusher element and said sealing ring.

24. A shaft seal according to claim 10 wherein said tertiary seal is provided by a lip formed integrally on and protruding from one of said seal housing and said auxiliary sleeve, said lip sealingly contacting the other of said seal housing and said auxiliary sleeve.

25. A shaft seal according to claim 10, wherein said pusher sleeve comprises an inner pusher sleeve element and an outer annular pusher disc, said inner pusher sleeve element and said outer annular pusher disc having respective radial surfaces maintained in contact with one another.

* * * * *